June 1, 1954     H. NACK ET AL     2,680,103
METHOD OF MAKING COMBINATION STAIN
FILLERS USING DYE CONCENTRATES
Filed March 12, 1951
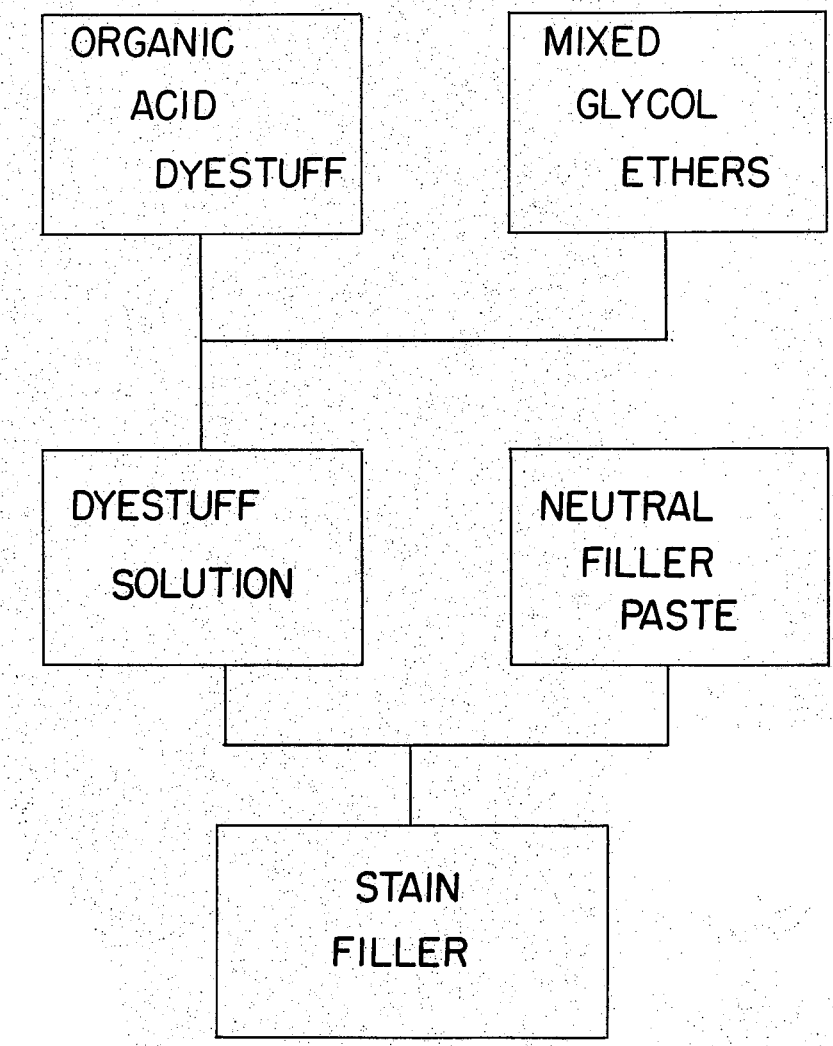
INVENTORS
HERMAN NACK
GEORGE L. DENISTON
BY *Toulmin & Toulmin*
ATTORNEYS Patented June 1, 1954

2,680,103

UNITED STATES PATENT OFFICE 2,680,103

METHOD OF MAKING COMBINATION STAIN FILLERS USING DYE CONCENTRATES

Herman Nack, Troy, and George L. Deniston, Dayton, Ohio, assignors to Chadeloid Corporation, Dayton, Ohio, a corporation of Delaware Application March 12, 1951, Serial No. 215,168

2 Claims. (Cl. 260—33.2)

This invention relates to improvements in stain filler compositions. More particularly the invention relates to a new method of producing a composition of the permanent staining type.

Stains and stain fillers of the so-called permanent type are now well known in the art. These compositions are characterized by non-fading and non-bleeding properties and by the important feature of penetration of the wood surface to which they are applied without undesirable raising of the grain. These compositions are produced by solving aniline dyes together with binder resins, inert fillers, wetting agents, dispersing agents and thinning mixtures in suitable solvents.

The present invention contemplates the provision of a method for the making of a stain filler composition which will have increased powers of penetration of the wood and increased coloring ability.

The invention further contemplates a stain filler of the glycol ether type having particular proportions of at least two glycol ethers in the solvent for the dye.

The attainment of the objectives of the invention is procured by making a solution of a dye concentrate in a glycol ether solvent containing a mixture of at least two ethers and thereafter combining the solved dye with a neutral paste containing the inert filler, the resin binder, wetting agents, dispersing agents and thinners.

It has been found that the dye solvent for acid organic dyestuff preferably contains diethylene glycol monomethyl ether to the extent of between about 12 to 20 parts, the balance being ethylene glycol monomethyl ether. A particularly satisfactory solvent material consists of 16.2 parts diethylene glycol monomethyl ether and 83.8 parts ethylene glycol monomethyl ether by weight.

It has also been found that the most desirable stain-filler is obtained if approximately 14 parts of a dye concentrate made up as set forth above are combined with approximately 86 parts of a neutral filler paste. While other ratios of these components may be utilized to advantage the above ratio yields particularly effective results both as to covering power and the penetration of the wood.

It is believed that when the particular sequence of combining steps is followed as set forth above the dyestuff enters into solution more thoroughly and is retained in solution upon the addition of the filler paste composition. Thus preferential absorption of the dye by the fillers and binder materials is avoided, resulting in an improved staining action of the stain-filler composition. Thus the improved filler yields increased coloring power as well as increased penetration of the wood fibers.

The components comprising the neutral paste filler are resins, wetting agents, dispersing agents, inert fillers and thinning agents.

Binder resins which are particularly suitable are the phenolic aldehyde resins, urea-formaldehyde resins, esterified resins or rosins, and resins of the alkyd type such as the polyesters of phthalic acid and ethylene glycol.

Wetting agents which are particularly suitable are morpholine which is a secondary amine, sulfonates and sulfates such as the sodium salt of alkyl naphthalene sulfonic acid (Darvan) and sodium heptadecyl sulfate (Tergitol #7) have been found to be most satisfactory.

Dispersing agents for the filler may be selected from such representative groups as the polyvinyl family, metal soaps and esters. Polyvinyl alcohol is preferred because it acts as a thickening agent for the stain composition as well as acting as a disperser. This compound may be used in proportions of 5 to 30 parts by weight of solution.

Thinners commonly used in this type of compound and suitable for the practice of this invention are methanol, toluol, benzene, or mixtures thereof.

The inert fillers may be Silene, which is a hydrated precipitated calcium silicate; Silex, which is a silica; diatomaceous earth; asbestine, clay, and similar materials. Inert pigments such as burnt umber, activated carbon, iron oxides, may also be used.

The dyestuffs found to be particularly useful in the practice of the present invention are acid organic materials of the aniline type characterized by fastness to light and ready solubility in vehicles of the hydroxyl group. Thus, for example, the following dyestuffs may be used alone or in combinations to produce almost any desired staining color: Buffalo Black NBR Conc. 126%, Black Stain B34951, Nigrosine 4523J Conc. Powder; the following yellow dyestuffs: Fast Wool Yellow 3 GL Conc. 125%, Fast Light Yellow 3G Ex. Conc., Fast Light Yellow D3GA; the following orange-yellow dyestuffs: Metanil Yellow 1955, Calcocid Yellow MXXX Conc.; the following orange dyestuffs: Fast Light Orange 2G, Fast Light Orange GA Conc.; the following red dyestuffs: Azo Rubine Ex. Conc. 133%, Calcocid Milling Red 7B Conc., Camoisine BA Extra Conc. CF, Chromolan Bordeaux R. Croceine Scarlet Moo.

The particular relative proportions of these components comprising suitable neutral filler pastes for the practice of the invention are well known to the art and form no part of the present invention, the only requirement being compatibility with the glycol ethers and the organic dyestuff material.

The invention will be more fully understood by reference to the accompanying flow sheet and to the following specific examples which are presented by way of illustration without intending thereby to limit the invention thereto:

*Example I*

A dye concentrate solution was first made utilizing the following materials in parts by weight:

6 parts red mahogany dye
50 parts of a solvent containing:
    80 parts ethylene glycol monomethyl ether
    20 parts diethylene glycol monomethyl ether The dye will be completely solved in the solvent material.

Thereafter a neutral paste was made up consisting in parts by weight of:

40 parts of an alkyd type resin having a phthalic anhydride base
15 parts polyvinyl alcohol
10 parts morpholine
20 parts hydrated precipitated calcium silicate This neutral paste was then combined with the dye solution in the following proportions in parts by weight:

14 parts dye solution
86 parts neutral filler

The stain-filler thus formed when applied to wood surfaces penetrates the pores and colors the wood exceedingly well.

*Example II*

The following dye concentrate solution was made utilizing in parts by weight:

4 parts croceine orange
2 parts scarlet red moo
3.4 parts Buffalo black
50 parts of a solvent containing:
    16.2 parts diethylene glycol monomethyl ether
    80.3 parts ethylene glycol monomethyl ether The dyes were completely solved in the glycol ethers.

A neutral filler paste was then made up containing in parts by weight:

30 parts phthalic anhydride base alkyd resin
10 parts polyvinyl alcohol
10 parts aluminum stearate
5 parts morpholine
30 parts hydrated precipitated calcium silicate
10 parts toluol
15 parts methanol This dye solution and neutral filler paste were then combined in the following proportions in parts by weight:

14 parts dye solution
86 parts neutral filler

This stain-filler when applied to a wood surface colored the same very well and was a decided improvement over the same composition formed by mixing all the components in one operation.

*Example III*

The following dye concentrate solution was made utilizing the following materials in parts by weight:

2.4 parts mahogany dye
20 parts of a solvent containing:
    80 parts ethylene glycol monomethyl ether
    20 parts diethylene glycol monomethyl ether The dye was completely solved in the solvent material.

Thereafter a neutral filler paste was made up consisting in parts by weight of:

10.0 parts methanol
10.0 phthalic anhydride glycerol resin (Beckosol #1313)
3.0 parts polyvinyl alcohol
40.0 parts toluol
60.0 parts Silex This neutral paste was combined with a dye concentrate solution in the following proportions in parts by weight:

20 parts dye concentrate solution
80 parts neutral filler

It will be understood that while there have been given herein certain specific examples of the practice of this invention, it is not intended thereby to have this invention limited to or circumscribed by the specific details of materials, proportions or conditions herein specified, in view of the fact that this invention may be modified according to individual preference or conditions without necessarily departing from the spirit of this disclosure and the scope of the appended claims.

We claim:

1. A process for the production of wood stain fillers having enhanced penetration and coloring characteristics comprising the steps of first forming a solution of red mahogany dye in a mixture of 80 parts of ethylene glycol monomethyl ether and 20 parts of diethylene glycol monomethyl ether, secondly forming a neutral paste containing an alkyd resin comprising the reaction product of phthalic acid and ethylene glycol, a filler, a dispersing agent and a wetting agent, and thereafter combining the dye solution with the neutral filler paste to produce the said stain filler.

2. A process for the production of wood stain fillers having enhanced penetration and coloring characteristics which comprises the steps of forming a dye concentrate comprising dissolving an acid organic dye in a mixture of diethylene glycol monomethyl ether and ethylene glycol monomethyl ether, wherein ethylene glycol monomethyl ether is present in the greater proportionate amount, said mixture of glycol ethers containing in 100 parts by weight between about 12 to 20 parts diethylene glycol monomethyl ether and the balance being ethylene glycol monomethyl ether, providing a paste comprising inert filler and a resin selected from the group consisting of phenol formaldehyde resin, urea formaldehyde resin, and polyesters of phthalic acid and ethylene glycol, and mixing said paste filler with said dye concentrate to produce a combined stain and filler.

References Cited in the file of this patent

UNITED STATES PATENTS

| Number | Name | Date |
|---|---|---|
| 2,161,503 | Bush | June 6, 1939 |
| 2,338,149 | Walker et al. | Jan. 4, 1944 |

OTHER REFERENCES

"Elvanol," Polyvinyl Alcohols, by the Du Pont Co., published 1947, pages 7 and 20.